Figure 1:
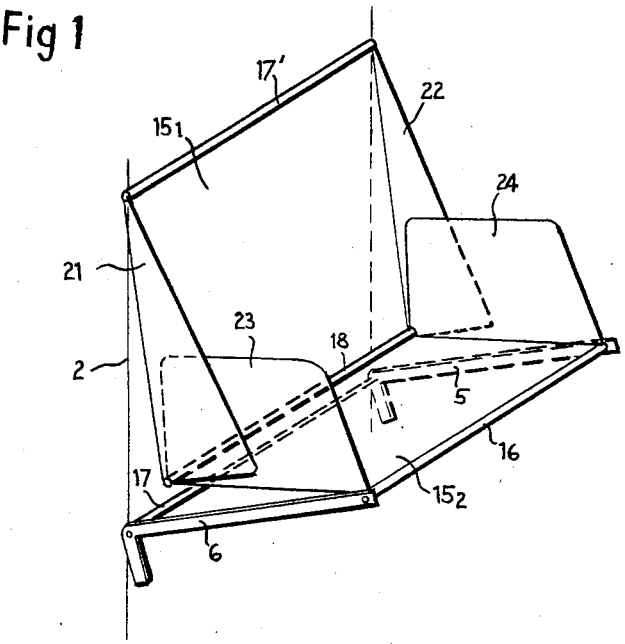

July 24, 1962  J. FIORAVANTI  3,045,807
CONVEYOR SYSTEM

Filed July 5, 1960  2 Sheets-Sheet 1

INVENTOR

JEAN FIORAVANTI

By Bailey, Stephens & Huettig

ATTORNEYS

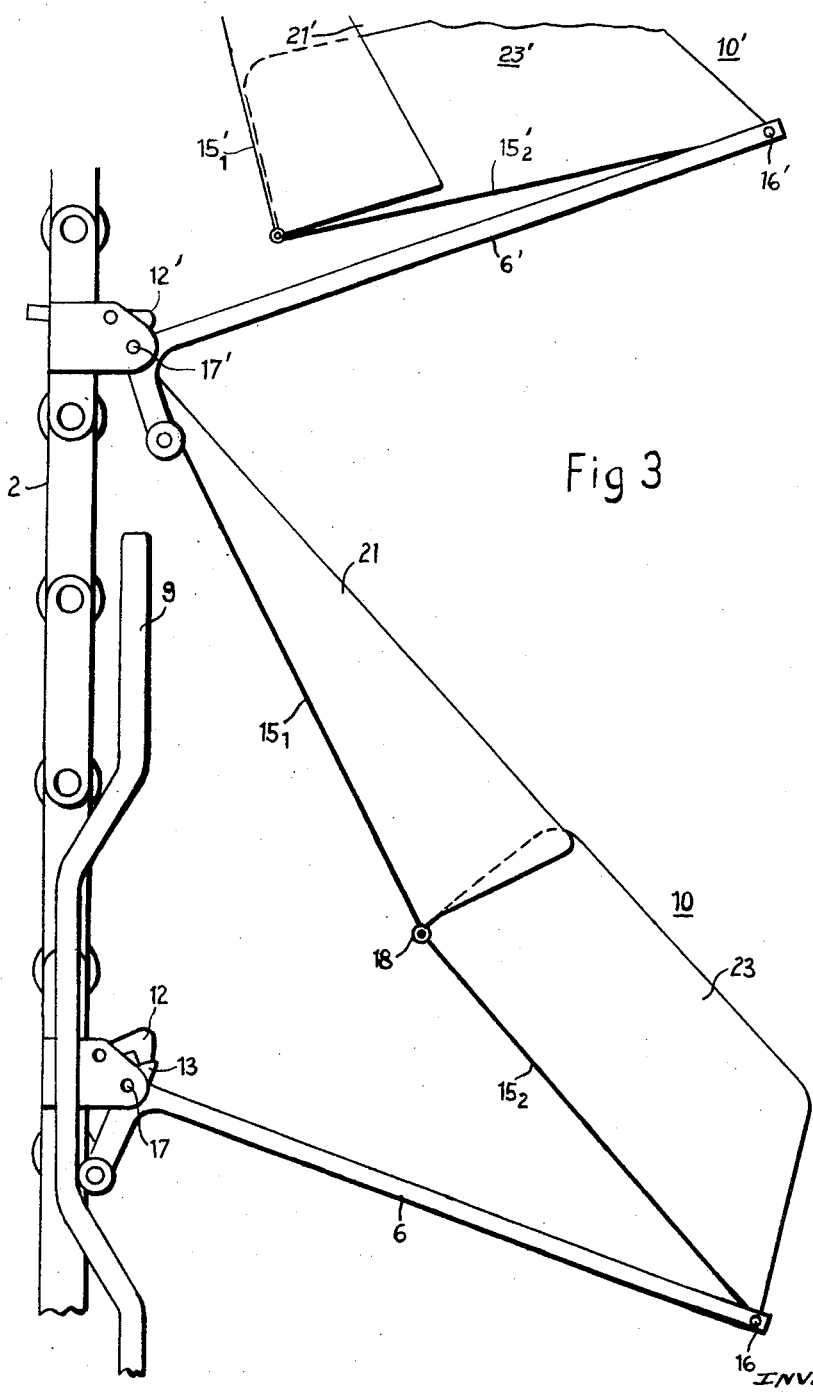

United States Patent Office 3,045,807
Patented July 24, 1962

3,045,807
CONVEYOR SYSTEM
Jean Fioravanti, 40 Ave. du Parc Montsouris,
Paris, France
Filed July 5, 1960, Ser. No. 40,592
Claims priority, application France July 3, 1959
2 Claims. (Cl. 198—153)

This invention relates to conveyor or elevator systems of the type using a generally vertically movable endless chain or the like with bucket-like carrier members supported in spaced relation thereon and adapted to be automatically operated for discharging or dumping the loads carried by said members.

More especially the invention is directed to a modified version of conveyor or elevator system of the type described and claimed in my copending U.S. application Ser. No. 746,555, filed July 3, 1958, now patent 2,956,668.

The apparatus described in my earlier application comprised, broadly, endless drive chain means displaceable along a path of travel, a plurality of supporting means mounted on and spaced along the drive means, a plurality of carrier members of flexible sheet material, and movable thereby between a carrying position in which the carrier member hangs limp to form a pocket capable of containing a load, and a dumping position in which it is stretched taut to dump said load, and means, such as a camway, adjacent said path and operatively engageable by said supporting means to control movement thereof between said carrying and dumping positions in response to movement of the supporting means along the path.

While the conveyor system of the earlier application has proved extremely advantageous in its practical operation for many types of loads in warehouses, mail sorting installations and the likes, it has been found that for some types of loads, the flexible sheet type of carrier member used therein was relatively ill-suited. Thus in the case of hard boxes with flat sides and sharp corners, the load tended to be unbalanced or lopsided and further was prone to damage the fabric elements and place them rapidly out of commission.

It is therefore an object of the present invention to provide a modified version of the conveyor or elevator apparatus described in my earlier application, which will be especially well-suited for generally flat loads. An object is to provide an elevator system having spaced carrier members made of interpivoted flat plate elements and automatically operable between a dumping and a carrying condition. A further object is to provide such apparatus having improved carrier members especially adapted for the carrying of loads having flat surfaces, and which will be readily fittable to the general structure provided in my earlier application, including the automatic control means thereof, without major alterations in said structure.

Figure 2:
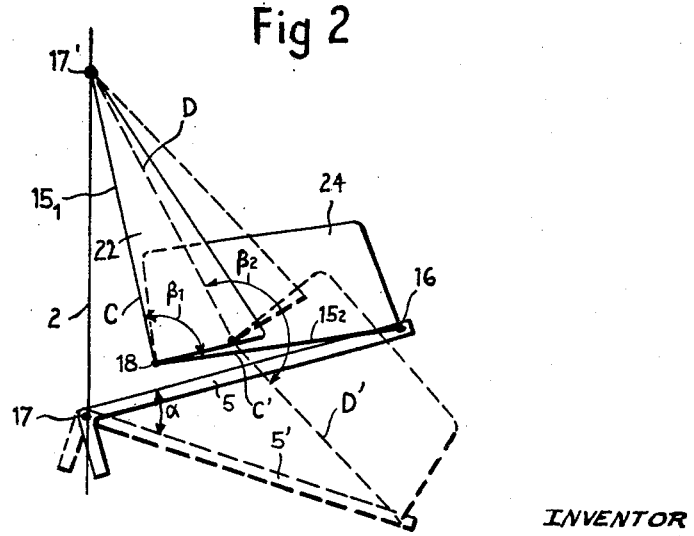

The above and further objects, features and advantages of my invention will become apparent from the ensuing description in which an exemplary embodiment is disclosed with reference to the accompanying drawings, wherein:

FIG. 1 is a schematic perspective view of a carrier member according to the invention in carrying position;

FIG. 2 is a diagrammatic view of the carrier member in side elevation showing the geometrical relationships between the components thereof, with said components being shown in full lines in the carrying condition and in dotted lines in the dumping condition of the member; and FIG. 3 is a larger-scale and more detailed view in side elevation, showing part of the conveyor apparatus of the invention with the endless drive chain thereof, camway, and a pair of adjacent carrier members one in dumping position and the other in carrying position.

Referring first to FIGS. 1 and 2 of the attached drawings, there is illustrated a carrier member for conveyor or elevator apparatus of the type described, comprising a pair of plates or boards $15_1$ and $15_2$ of rigid, lightweight material, of generally rectangular form and pivoted to one another along adjacent horizontal side edges by a suitable pivot 18. The side of plate $15_1$ remote from pivot 18 is pivoted to a crossbar 17' fixedly attached across a pair of elevator or conveyor chains diagrammatically shown at 2, and the side of plate $15_2$ remote from pivot 18 is pivoted to a crossbar 16 which is carried at the outer ends of the pair of supporting arms 5 and 6 which at their other ends are bodily rotatable together on a crossbar 17 extending across the conveyor chains 2.

Referring especially to FIG. 2, it will be seen that with supporting arms 5 and 6, in the full-line position, the plates $15_1$ and $15_2$ are supported in the full-line position so as to define therebetween an angle $\beta1$ of about 90° and the lower plate $15_2$ slopes at a slight angle upwardly from its pivot 18, so that the carrier member is in a condition stably to contain and support a load or object therein. When on the other hand the arms 5 and 6 are rotated to the dotted position shown as 5', the plates $15_1$ and $15_2$ are spread out so as to form an angle $\beta2$ approaching, though somewhat less than, 180°, and the lower plate $15_2$ slopes rather steeply downward from its pivot. This is the dumping position of the carrier element.

It is important to observe that in order to shift the carrier member from its carrying to its dumping position, the arms 5—6 require to be rotated by a relatively small angle as shown at $\alpha$ whereby advantages broadly similar to those provided by the flexible carrier element of the prior application are here also achieved, and a highly positive and fast dumping action is brought about.

Each of the plates $15_1$ and $15_2$ is preferably provided with projecting side flanges such as 21—22, 23—24, at right angles to the respective plates, and slidable relatively to one another during the movements of the carrier between carrying and dumping positions. These side flanges serve to retain the articles loaded on the carrier and prevent their escape laterally therefrom.

FIG. 3 illustrates in greater detail a pair of adjacent carrier members of the type just described mounted on the conveyor chain structure, one exemplary construction of which is here shown in greater detail as comprising two (only one shown) horizontally spaced vertical chains made up of interpivoted chain links. The lower carrier member 10 is shown in dumping condition and the upper carrier 10' (only partly shown) in carrying condition.

The means for controlling movement of the individual carriers between their carrying and dumping conditions, during the bodily vertical displacement of all the carriers with the conveyor chains, and as each individual carrier reaches a predetermined dumping or unloading station, are provided broadly similar to the corresponding means shown and described in the afore-mentioned copending application, nor will the detailed description thereof be repeated herein.

Briefly, there are provided stationary camways such as 9 extending alongside the path of travel of the carrier members in one or more selected areas of said path, and engageable by follower rollers journalled on appendages projecting from the rotatable lower arms such as 5 and 6 of the carriers. The camways are so contoured as to impart the requisite rotations to said rotatable arms for moving each carrier member from carrying to dumping condition and then back to carrying condition as the member moves past an unloading station.

Furthermore, the system includes means for selectively dumping each individual carrier member at a selected one of a plurality of dumping stations. Such a possibility is especially valuable for example where the elevator is installed in a warehouse, store, or in mail sorting installations, where more than one loadinng station or level is provided, and it is desirable that means be provided at each loading station for pre-selecting the particular unloading station at which each individual loaded carrier member will be dumped. The invention accordingly provides means whereby such operations can be simply and efficiently carried out.

For this purpose the pivotal supporting arms such as 6 (FIG. 3) are provided with latching means which are normally operative to prevent rotation of the supporting arms away from their carrying position by the camway, and thereby prevent the dumping of the related carrier member. Selector means are moreover associated with each carrier whereby the related latching means can be temporarily disabled, to permit dumping of the carrier at a selected station.

Each latching device herein is provided by pawl 12 which cooperates with a catch 13 carried by each pivotal supporting arm such as 6. It will be seen that with pawl 12 engaging catch 13, as is shown in 12' and 13' for the upper carrier element of FIG. 3, the arm 6 or 6' of that carrier will be held in raised position out of engagement with the camway 9, and the carrier will be caused to remain in its carrying condition. At each station along the vertical path of the carrier members selective means are provided for disabling the latch pawl of a carrier as the carrier moves past the station. Further, each carrier comprises presetting means presettable to any one of a plurality of settings for selecting the particular station at which said selective means will disable the latching means, i.e. pawl, for dumping the related carrier. The construction of the above mentioned means may be entirely similar to what was described in my co-pending application, and reference may be had thereto for an understanding of the construction and operation of said means.

What I claim is:

1. Conveyor apparatus comprising endless drive means displaceable along a substantially vertical path of travel, a plurality of supporting means articulately mounted on and spaced along the drive means, a plurality of carrier members carried by the supporting means and each compising at least two rigid elements, means pivotally mounting a first of the rigid elements about one axis only on the drive means for swinging movement towards and from the path of travel thereof and a second rigid element on the supporting means, means pivotally connecting the first and second rigid elements, one of said mounting means being higher than the other, the supporting means including means movably supporting at least one element of each carrier member for movement between two positions in the first of which said rigid elements form a relatively smaller angle to hold the load and a second position in which the rigid elements form a substantially larger angle to dump said load, at least that rigid element of each said carrier member having the lower mounting means being provided with at least one side flange projecting from one side of such rigid element towards the other rigid element for assisting in retaining said load, and means adjacent said path operatively engageable by said supporting means to control movement thereof between said two positions in response to movement of the supporting means along the path.

2. Conveyor apparatus comprising endless drive means displaceable along a substantially vertical path of travel, a plurality of supporting means mounted on and spaced along the drive means, a plurality of carrier members carried by said supporting means and each comprising two flat rigid elements, means pivotally mounting one of the rigid elements about one axis only on the drive means for swinging movement towards and from the path of travel and the other rigid element on the supporting means, means pivoting the two rigid elements directly to each other, one of said mounting means being higher than the other, the supporting means including means movably supporting the lower of the rigid elements of each carrier member for movement between a carrying position in which said elements form a relatively small angle and said lower element is not inclined down and away from the other element so as to be capable of retaining a load and a dumping position in which said elements form a larger angle and said lower element is inclined down and away from the other element to dump said load, said lower element being provided with at least one side flange projecting from one side of such element towards the other element for assisting in retaining said load, and means adjacent said path operatively engageable by said supporting means to control movement thereof between said positions in response to movement of the supporting means along the path.

References Cited in the file of this patent

UNITED STATES PATENTS

| | | |
|---|---|---|
| 1,004,992 | Christ | Oct. 3, 1911 |
| 2,956,668 | Fioravanti | Oct. 18, 1960 |